(No Model.)  2 Sheets—Sheet 1.
J. C. MURRAY.
COUPLING PIN.
No. 299,083.  Patented May 20, 1884.
Fig. 1.
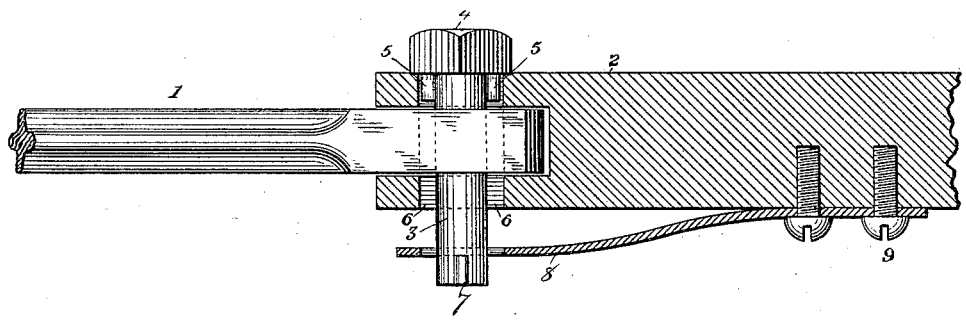
Fig. 2.  Fig. 3.
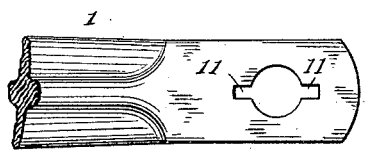 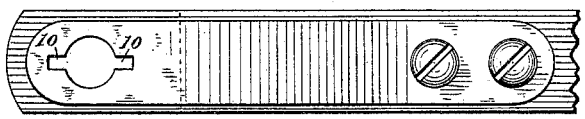
Fig. 4.  Fig. 5.
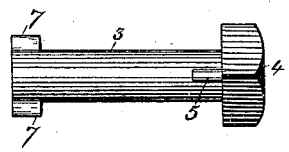 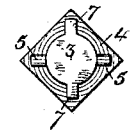
WITNESSES  
Ed. A. Newman  
Al. E. Newman
INVENTOR  
James C. Murray  
By his Attorneys  
Knight Bros.

(No Model.)  2 Sheets—Sheet 2.

J. C. MURRAY.
COUPLING PIN.

No. 299,083. Patented May 20, 1884.

WITNESSES
Ed. A. Newman.
Al. C. Newman.

INVENTOR
James C. Murray,
By his Attorneys
Knight Bros.

UNITED STATES PATENT OFFICE.

JAMES C. MURRAY, OF SOUTH CHARLESTON, OHIO.

COUPLING-PIN.

SPECIFICATION forming part of Letters Patent No. 299,083, dated May 20, 1884.

Application filed January 16, 1884. (No model.)

*To all whom it may concern:*

Be it known that I, JAMES C. MURRAY, a citizen of the United States, residing at South Charleston, in the county of Clark and State of Ohio, have invented certain new and useful Improvements in Coupling-Bolts, of which the following is a specification.

The subject of my invention is a self-locking coupling-bolt adapted for connecting the cutter-bar of a harvester to its pitman, or for coupling the shaft or pole irons of a carriage to the axle-clip, or for other purposes.

It consists, essentially, of a bolt with a head so formed and seated as to prevent its rotation, a point having one or more lips or feathers, and a keeper notched for the passage of the feathered point of the bolt, and serving the joint purpose of preventing the retraction of the bolt when the latter has been turned from the position in which it is inserted, and of holding the head within its seat in order to prevent the spontaneous turning of the bolt into a position which will permit its escape.

In order that my invention may be fully understood, I will proceed to describe it with reference to the accompanying drawings, in which—

Figure 6:
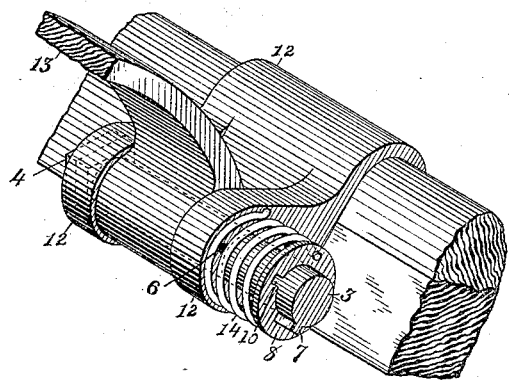
Figure 7:
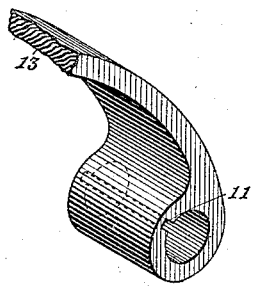
Figure 8:
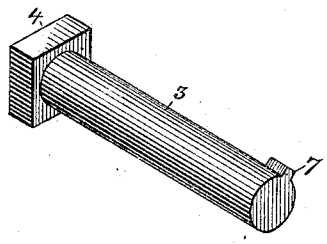

Figure 1 is a plan, partly in section, showing a bolt with lips or tongues at its head and point and a keeper formed of a plate-spring. Fig. 2 is a face view of the pitman, shown in Fig. 1 detached from the other parts. Fig. 3 is a face view of the keeper and the member to which it is attached. Fig. 4 is a side view of the bolt. Fig. 5 is an end view of the same. Fig. 6 is a perspective view of the bolt applied to a thill-coupling, showing the bolt with a single retaining lip or tongue and a keeper of modified form. Fig. 7 is a perspective view of the thill-iron detached. Fig. 8 is a perspective view of the bolt detached.

In Fig. 1, 1 may represent a pitman to be coupled to a harvester cutter-bar, or any other object, and 2 a bar connected with the said pitman, so as to be moved thereby. The invention does not relate to any peculiarity of construction or form in the bar 2, and hence no special construction is here shown.

3 represents the improved safety-bolt, which, in Figs. 1 and 4, is shown formed with a square head, 4, and two lips or tongues, 5, beneath it, the head fitting in corresponding slots, 6, in the bar so as to prevent the rotation of the bolt when fully inserted, and with two lips or tongues, 7, at its point, arranged at right angles to the tongues 5.

8 is a keeper consisting of a plate-spring secured to the bar 2 by screws 9, or other means, and formed with notches 10, as shown in Fig. 3, to permit the passage of the point of the bolt when the tongues 7 thereon are in position to enter the said notches 10, and to prevent the retraction of the bolt when it is turned ninety degrees from its position in entering. The pitman 1 is formed with corresponding notches, 11, to permit the passage of the tongues 7 at the end of the bolt. The pitman may, of course, be formed with a bifurcated end, and the cutter-bar with a single perforated lug to fit the same in customary manner, these parts being notched for the passage of the end tongues of the bolt, as already described.

In the modification shown in Figs. 6 and 8, the bolt 3 is formed with a single tongue, 7, at its end, and its rotation, when fully inserted, is prevented by the reception of its square head 4 in a corresponding seat prepared for it in one of the lugs or ears of the axle-clip 12, the said lugs or ears being provided with notches 6 for the passage of the end tongues, 7, of the bolt, as in the first illustration. The shaft-iron 13 is coupled to the lugs. This shaft-iron will be seen to take the place of the pitman 1 in the first illustration of the invention, while the axle-clip 12 bears the same relation to my improved coupling-bolt 1 as the bar 2 in the first illustration. The shaft-iron 13 is accordingly formed with a slot, 11, for the passage of the tongue 7 on the end of the bolt.

The keeper 8, in the modification shown in Fig. 6, takes the form of a washer notched at 10, to permit the passage of the end tongue, 7, of the bolt and pressed outward by a spring, 14.

In operation, the bolt is first inserted with the end feather or feathers, 7, in such position as to pass through the notches 6 and 11 in the bar 2 and pitman 1, or in the clip-lugs 12 and shaft-iron 13, or any other two parts to be coupled by the bolt, as the case may be. The keeper 8 in either form being pressed inward, the end feather or feathers pass likewise through the notch or notches 10 in said keeper, after which the bolt is turned ninety degrees, so as to engage the tongues 7 over the keeper 8, which is then released and draws the bolt in to its full extent, seating the square head 4 or feathers 5 in recesses or notches prepared therefor, so as to effectually prevent the spontaneous turning of the bolt in such position as would permit its escape.

Having thus described my invention, the following is what I claim as new therein and desire to secure by Letters Patent:

A coupling-bolt, 3, provided with one or more ribs or feathers, 7, near its point, in combination with a slotted plate pressed outward against the said rib or feather when the bolt is turned after insertion, and a locking device to prevent the spontaneous turning of the bolt.

JAS. C. MURRAY.

Witnesses:
 OCTAVIUS KNIGHT,
 HARRY E. KNIGHT.